No. 681,660. Patented Aug. 27, 1901.
O. A. SPAHR.
PRIMARY BATTERY.
(Application filed June 9, 1900.)
(No Model.)
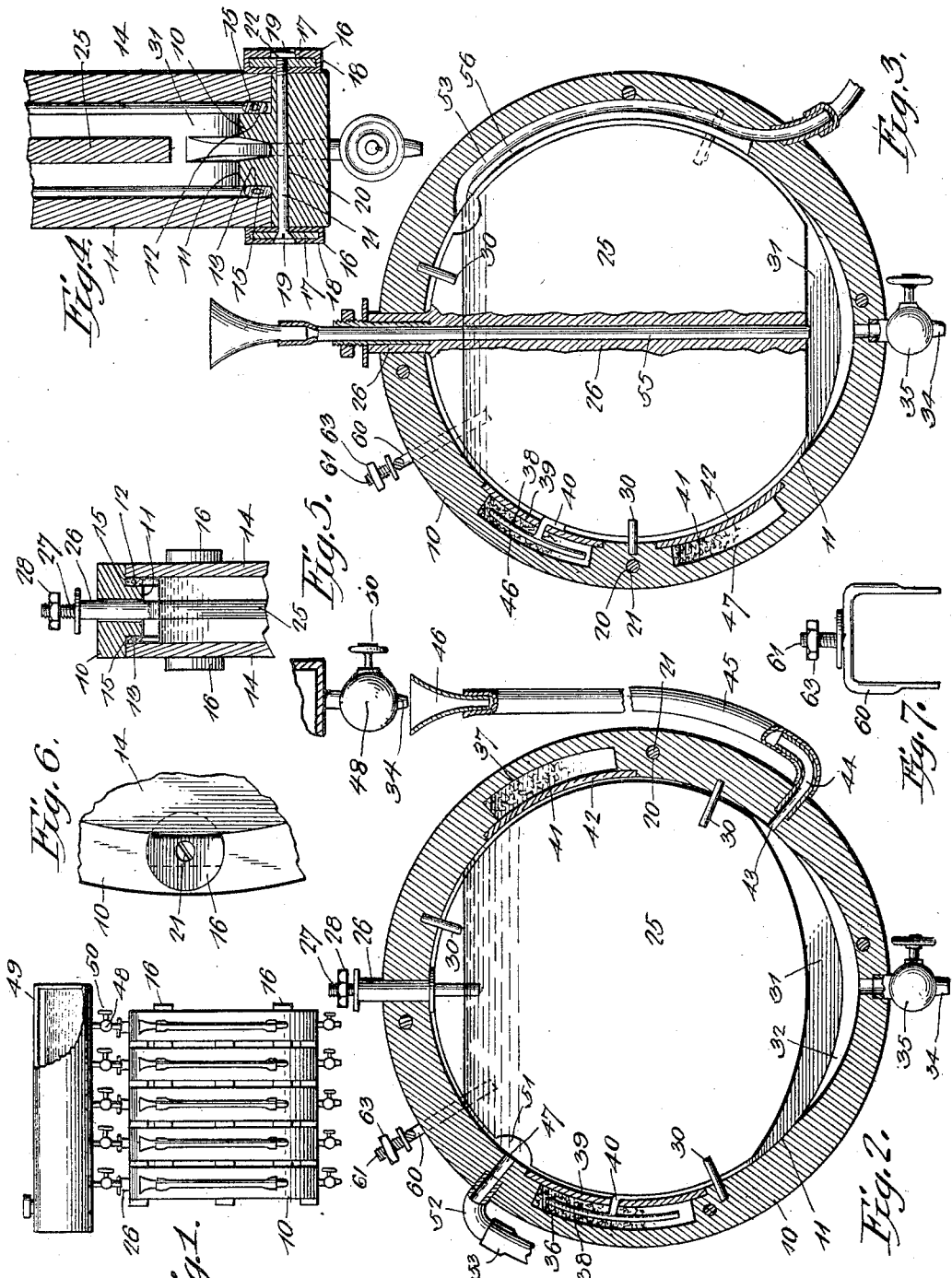
Witnesses
J. Frank Culverwell,
Geo. H. Chandlee
O. A. Spahr, Inventor.
by C. A. Snow & Co.
Attorneys

UNITED STATES PATENT OFFICE.

OTTO A. SPAHR, OF MILLERSBURG, OHIO.

PRIMARY BATTERY.

SPECIFICATION forming part of Letters Patent No. 681,660, dated August 27, 1901.

Application filed June 9, 1900. Serial No. 19,749. (No model.)

*To all whom it may concern:*

Be it known that I, OTTO A. SPAHR, a citizen of the United States, residing at Millersburg, in the county of Holmes and State of Ohio, have invented a new and useful Primary Battery, of which the following is a specification.

This invention relates to electric batteries in general, and more particularly to primary batteries; and it has specific reference to the Grenet type, wherein the elements are exposed to the direct action of the electrolyte in contradistinction to the type of battery wherein there is an interposed porous partition between the elements.

The object of the invention is primarily to provide a battery of the above-named type wherein polarization of the negative plate or plates will be prevented to maintain a constant potential of the battery, whether the battery consists of a single cell or a plurality of cells, a further object being to permit the connection of a number of cells in series and at the same time to maintain a constant and equal efficiency of the electrolyte, so that the electromotive force of the compound battery will have a value equal to the multiple of the values of all of the individual cells.

An additional object of the invention is to provide a construction wherein amalgamation of the zinc plate will be efficiently performed without waste by oxidation of free mercury and to provide for supplying a depolarizing agent to the electrolyte as required.

Further objects of the invention are to form a battery in which the maximum wasting of the zinc will be at the lower edge thereof and in which the resultant salts will be collected at a point where short-circuiting of the battery will be prevented and where they may be drawn off readily; also, to provide a simple and efficient means for holding the members of the battery together and for insulating one cell from another when a number are combined.

An additional object of the invention is to provide means for making efficient connections with the several plates of the battery, other objects and advantages of the invention being evident from the following specification.

In the drawings forming a portion of this specification and in which like numerals of reference indicate similar parts in the several views, Figure 1 is a view partly in section and partly in elevation and showing a number of cells connected in series, the apparatus for supplying air and electrolyte thereto being also shown. Fig. 2 is a central vertical section of the battery with the zinc plate and portions of other parts in elevation. Fig. 3 is a view similar to Fig. 2 and showing a second form of the battery. Fig. 4 is a vertical section of the lower portion of the battery, taken at right angles to the section of Fig. 2. Fig. 5 is a vertical section of the upper portion of the battery shown in Fig. 1. Fig. 6 is a detail elevation showing the form and arrangement of a turn-button. Fig. 7 is an elevation showing the yoke by means of which connection is made with the carbon plates.

Referring now to the drawings, the battery of the present invention consists of a central ring 10, of vulcanite or other suitable material which is non-conducting, whether elementary or composite, and upon the inner periphery of which is formed a flange 11, resulting in the formation of shoulders 12 and 13, against which are disposed the negative plates 14 of the battery, these negative plates being preferably of carbon of sufficient porosity to permit passage of hydrogen gas therethrough, although it will be understood from the following description that a number of the features of the battery may be developed without necessitating the use of carbon. Carbon is, however, used in the present instance. These carbon plates are held against rubber or other liquid-holding gaskets 15, which are disposed against the shoulders 12 and 13 prior to the application of the plates. In order to hold the carbon plates in place and, furthermore, to prevent mutual contact of the adjacent plates when a number of cells are connected in close relation, insulating turn-buttons 16 are provided. The turn-buttons are disposed at opposite sides of the battery and each consists of a segmental plate 17, having an inclosure 18 of insulating material, and through the button is formed an axial perforation 19, the outer end of which is countersunken, as shown. Perforations are formed longitudinally through the ring 10, as shown at 20, and pivot-bolts 21 are passed through these perforations 20 and the perforations of corresponding buttons, the head of each bolt lying in the countersink of a button at one side of the battery, while the clamping-nut 22 lies within the countersink of the corresponding button at the opposite side of the battery, both ends of the bolt and the outer surface of the nut lying below the outer surfaces of the turn-buttons, so that one cell of battery may be brought to lie close to a second cell and will be held insulated therefrom and separated by an interspace sufficient to permit a free circulation of air. It will be noted that there is thus formed a short cylindrical casing or battery-jar, the ends of which are formed by the negative elements of the battery.

The positive element 25 of the battery is in the form of a disk having a comparatively small segment cut from its lower edge, this element 25 being of zinc and of such dimensions that it may fit within the inclosure of the flange 11 and with its side faces separated from the inner faces of the carbon plates or disks by interspaces sufficient to permit free circulation of the electrolyte and to prevent establishment of a short circuit. A supporting-stem 26 is cast at the uppermost point of the plate and extends inwardly beyond the periphery thereof, and in this stem is cast a screw or bolt 27, with which is engaged a binding-nut 28 for attachment of circuit-wires, the nut acting to clamp the wire or wires firmly against the upper end of the stem in the well-known manner. This stem projects outwardly of the ring 10 through a radial perforation in the upper side thereof, as shown. The zinc plate or element is prevented from lateral movement and consequent contact with the carbon plates by means of insulating-pins 30, which are engaged with perforations in the flange 11 and which lie closely against the faces of the zinc plates. With the form of zinc plate shown it will be seen that there results an enlarged chamber 31 between its lower straight edge and the adjacent surface of the flange 11 of the ring 10, and to further enlarge this chamber a channel 32 is cut into the flange 11, the ends of this channel terminating adjacent to the lower edge of the zinc plate. The chamber in question is formed to receive the salts resulting from the chemical action of the electrolyte upon the zinc plate, and to draw off these salts from time to time an outlet-pipe 34 is provided, which communicates with the lowermost point of the channel 32 and has a stop-cock 35 for opening and closing it. Additional channels or pockets 36 and 37 are formed in the inner face of the flange 11, and in these pockets are disposed amalgamating and depolarizing compounds in the form of salts. The amalgamating compound is indicated at 38 in the pocket 36 and consists of bisulfid of mercury in proper combination, which is held in place by a porous plate 39, through which is passed a wire or strip 40 of metal, which dips at one end into the amalgamating material and at the opposite end rests against the zinc plate, the result being that the amalgamation of the zinc plate is maintained. The depolarizing agent (indicated at 41 in the pocket 37) is also held in place by means of a porous plate 42, these porous plates being disposed in the countersunken ends of the pockets, as shown. The porosity of these retaining-plates permits action of the electrolyte upon the salts in the pockets and at the same time prevents their too-rapid disintegration.

In the battery as described and shown there is provided only a small space for the reception of the electrolyte, and to compensate for the tendency to rapid deterioration of so small a bulk of electrolyte it is necessary to intermittently supply fresh electrolyte and permit waste of the excess quantity. This fresh supply of electrolyte should so enter the battery as to supply both sides of the positive plate in the present construction with the same efficiency of electrolyte, and for this reason it is introduced at the bottom of the battery, while the waste passes off in the form of an overflow at a point adjacent the top of the battery. In addition to supplying fresh electrolyte I also wish to supply to the active faces of the carbon plates oxygen to prevent polarization, and in practice both the fresh electrolyte and air which forms the oxidizing agent are introduced through the same opening at the bottom or near the bottom of the battery and below the line of the lower edge of the zinc plate. This supply-opening is shown at 43, and leading therefrom is a nipple 44, with which is connected a preferably-flexible tube 45 of small interior diameter and having a funnel 46 at its upper end. In practice the funnel end of the tube 45 is supported at a point above the level of the electrolyte in the battery, which is determined by the position of the overflow or waste opening 47, and the funnel is held below the mouth of a discharge-pipe 48, leading from a storage tank or reservoir 49, the discharge-pipe having a stop-cock 50 to regulate the flow of the electrolyte from the tank or reservoir, so that it will descend drop by drop into the flared end of the funnel. As the electrolyte drops into the funnel it compresses the air above the level of the electrolyte in the tube 45, and the weight of the liquid thus contributed in drops carries this compressed air in the form of bubbles downwardly and discharges it into the bottom of the battery, the opening 43 being disposed in the plane of the zinc plate, so that the electrolyte contributed, as also the air, will divide and pass up both sides of the zinc plate, supplying fresh electrolyte to all portions of the battery and bringing the air-bubbles into contact with both carbon plates. The overflow or waste opening 50 is at a point near the upper edge of the zinc plate and is formed radially of the ring 10 and in the plane of the zinc plate, a recess 51 being cut in the adjacent edge of the zinc plate to permit free overflow of the electrolyte. A nipple 52 leads from the overflow-opening, and connected with this nipple is a waste-pipe 53, which is led to any suitable point of discharge. With this construction it will be seen that a circulation of the electrolyte is maintained, the efficiency of the electrolyte is maintained, polarization is prevented, and proper amalgamation of the zinc plate is maintained, thus giving a battery of high potential and high efficiency.

When a number of cells of battery are to be connected to form a compound battery, the cylindrical cells are placed end to end and separated by their insulating turn-buttons, the several cells being supported in a suitable rack and having their electrolyte-supply pipes preferably leading from a common tank or reservoir, so that the efficiency of the electrolyte in each cell will be at all times approximately equal to that of every other cell, although of course the electrolytes for the several cells may be supplied from different tanks.

In Fig. 3 of the drawings there is shown a modification in which the supply-pipe for the electrolyte and air is introduced through the zinc plate, the stem 26, which has a greater thickness than the plate, being continued to the lower edge of the plate and being formed tubular to receive a non-corrosive bushing 55, which may be a hard-rubber tube having a funnel at its upper end to receive the electrolyte. In this form of the invention also the overflow-pipe or waste-pipe 53 is disposed in a groove 56 in the inner face of the flange 11 of the ring 10, the lower end of the tube being passed outwardly through an opening in the ring 10, while the upper end thereof is turned inwardly to receive the waste electrolyte. This arrangement of the waste-pipe necessitates the formation of both pockets 46 and 47 in the same side of the ring 10, as shown.

In practice various other modifications of the specific constructions shown may be made and any suitable materials and proportions may be used for the various parts without departing from the spirit of the invention.

In order to make wire connections with the two carbon plates, a yoke 60 is disposed to straddle the ring 10 and lie with its flat ends against the outer faces of the plates, said yoke being held in place by the resiliency of its metal. A binding-post in the form of a stem 61 is formed upon or secured to the yoke and is threaded to receive a binding-nut 63 to hold the circuit-wires to the yoke.

With the construction shown it will be seen that creeping of the salts from the inclosure of the battery is prevented, the stem of the zinc plate having a washer 65 at its lower portion, which effectively closes the opening in the ring 10 through which the stem passes, and the stem and adjacent portions of the ring may have a coating of paraffin. Furthermore, creeping of salts up the fluid-inlet tube is prevented by reason of the small diameter of the tube and the fact that the entering fluid keeps it clean.

What is claimed is—

1. An electric battery comprising plates of like potential a third plate of different potential disposed between the first-named plates, a supply-pipe leading to a point below and in the plane of the third plate to discharge against the lower edge of the plate, and means constructed and arranged to supply alternate charges of gas and electrolyte through said pipe.

2. An electric battery comprising plates of different potentials and having an inlet-opening below and in the plane of one of the plates, and means constructed and arranged to supply alternate charges of gas and electrolyte through said inlet-opening, whereby they may divide and rise at both sides thereof.

3. An electric battery comprising spaced negative plates and an interposed positive plate and having an inlet-opening below and in the plane of the positive plate, and means constructed and arranged to supply alternate charges of gas and electrolyte through said opening, whereby they may divide and rise in contact with both faces of the positive plate.

4. The combination with a battery comprising spaced negative plates and an interposed positive plate, an electrolyte covering portions of the plates, and a tube opening into the battery at a point below and in the plane of the positive plate, said tube extending to a point above the level of the electrolyte, of means constructed and arranged to supply alternate bodies of air and electrolyte through said tube.

5. The combination with a battery comprising spaced negative plates and an interposed positive plate, an electrolyte covering portions of the plates, and a tube communicating with the battery at a point below and in the plane of the positive plate, said tube extending above the level of the electrolyte, of means constructed and arranged to drop electrolyte into the tube to compress the air therein and force it into the battery with the electrolyte.

6. The combination with a plurality of cells of battery, each comprising spaced plates of one potential and an interposed plate of a different potential, and a separate supply-tube connected with each cell at a point below and in the plane of the interposed plate of its respective cell, of means constructed and arranged to drop electrolyte into the tubes, and a separate overflow for each cell.

7. A battery comprising electrodes of different potentials, one of said electrodes being a plate having a longitudinal passage therethrough between its active faces to convey fluids from one end to the other thereof, said plate having a tubular extension forming a continuation of the bore of the plate and adapted to receive and direct gas and liquid to the bore of the plate to pass therethrough.

8. A battery comprising spaced plates of one potential and an interposed plate of a different potential, the interposed plate having a longitudinal passage extending through it, means for supplying fluids through the passage to discharge below and in the plane of the interposed plate, and an overflow for the battery.

9. A battery comprising electrodes of different potentials, one of said electrodes being a plate having a longitudinal passage extending through it, a bushing engaged with the inner surface of the passage, said bushing extending exteriorly of the plate and having external threads, and a clamping-nut upon the bushing.

10. A battery comprising a circular frame, elements fixed in the ends of the frame, an element disposed between the first-named elements, an arc-shaped recess in the inner face of the frame below the interposed element, and a draw-off pipe communicating with the recess.

11. A battery comprising a frame, elements disposed in the ends of the frame to form a containing vessel, an insulating turn-button at each end of the frame and disposed for engagement with the plates to hold them in the frame, and a common pivot for the turn-buttons.

12. A battery comprising a plurality of cells, each including a frame having elements disposed in its ends to form a containing vessel, and insulating turn-buttons pivoted upon the frame and adapted for movement into and out of engagement with the plates, said buttons being adapted to lie against the plates of the adjacent cells to hold said cells spaced.

13. The combination with a frame having elements disposed in its ends to form a containing vessel, of a spring-metal yoke disposed to straddle the frame and lie with its ends against the plates, and a binding-post carried by the yoke.

14. The combination with a frame having elements disposed in its ends to form a containing vessel, of a metal yoke disposed to straddle the frame and lie with its ends against the plates, and a binding-post carried by the yoke.

In testimony that I claim the foregoing as my own I have hereto affixed my signature in the presence of two witnesses.

OTTO A. SPAHR.

Witnesses:
C. M. SWINGLE,
GEO. W. CHANALEE.